Dec. 26, 1967     H. H. TODD     3,360,347
PRODUCTION OF POROUS MATERIALS
Filed July 24, 1964
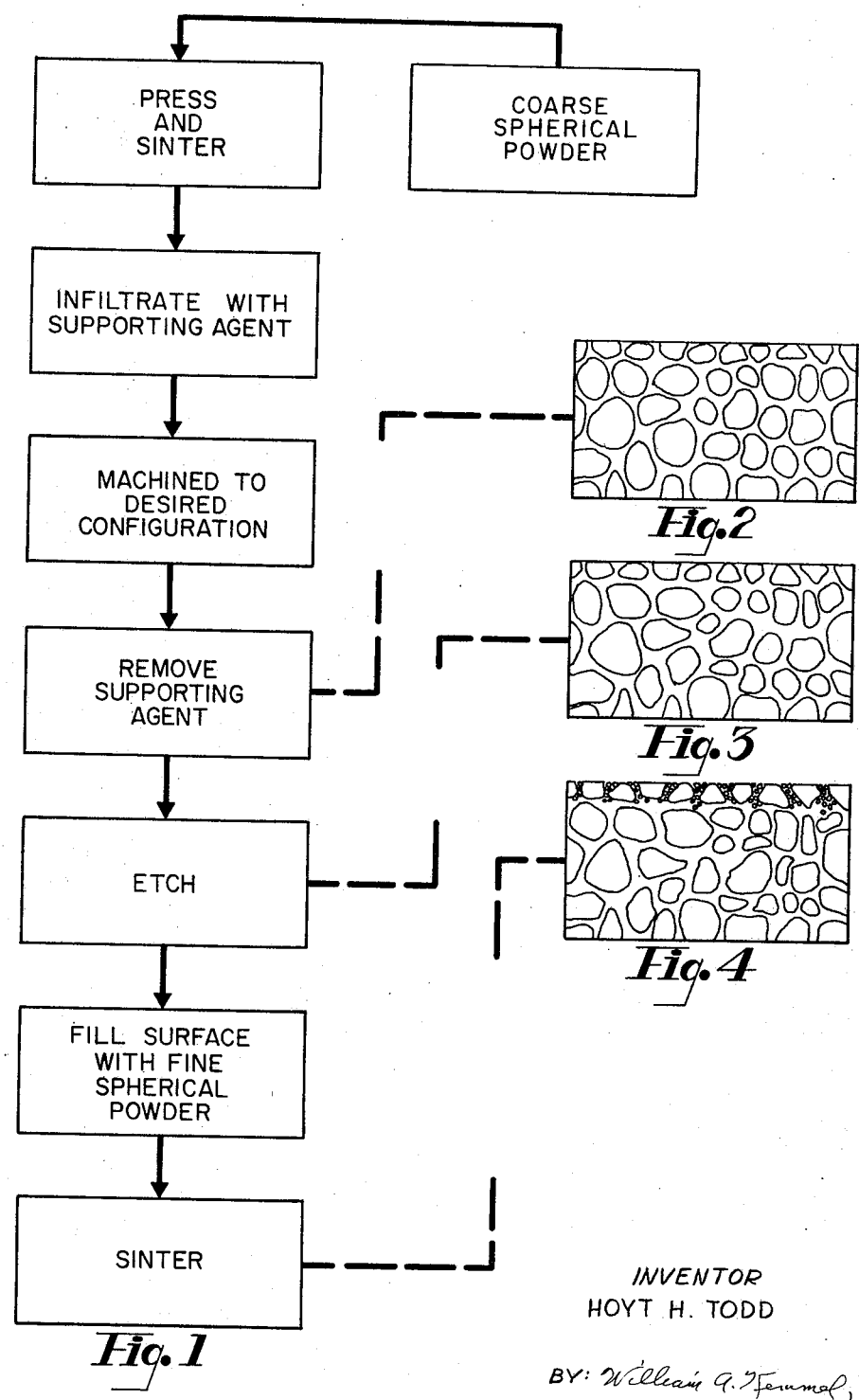
INVENTOR
HOYT H. TODD
BY: *William G. Femmel, Jr*
ATTORNEY

United States Patent Office 3,360,347
Patented Dec. 26, 1967

3,360,347
PRODUCTION OF POROUS MATERIALS
Hoyt H. Todd, La Habra, Calif., assignor to Electro-Optical Systems, Inc., Pasadena, Calif.
Filed July 24, 1964, Ser. No. 384,957
10 Claims. (Cl. 29—182.1)

In general, the present invention relates to a porous structure having high temperature stability and high surface portion area as well as the method of producing a stable pore structure having a selected pore size and concentration.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In recent years, there has been an extensive national research and development program on space propulsion systems, particularly, rocket engines. The first rocket engines to be developed were the chemical rocket engines which depended upon the burning of a chemical fuel to develop the thrust to push the rocket through space. However, it has been recognized for many years that chemical rocket engines are not suitable for long range space missions because of the enormous amounts of fuel they require. Consequently, efforts have been directed towards the development of electric rocket engines which are capable of generating thrusts over long periods of time with a small expenditure of fuel. The presently known, most efficient electric engine is the ion engine wherein fuels such as cesium are converted from neutral atoms to ions and then such ions are accelerated through an electric field to provide the thrust. One well known way of forming an ion from a neutral atom, i.e., stripping an electron from an atom, involves the surface ionization process wherein the atom is brought into contact with a suitable heated ionizer surface such as tungsten and such contact causes an ion to leave the atom. The presently preferred method of contacting the fuel atom such as the cesium atom with the ionizer surface such as the tungsten surface involves diffusing a cesium vapor through a heated, finely porous plug of tungsten with the result that cesium ions are discharged from the tungsten surface into an adjoining electric field. A brief description of the operation of such an ion engine is to be found in International Science and Technology, January 1964, pp. 52–59.

From the foregoing brief discussion, it can be seen that for the proper operation of an ion rocket engine it is necessary to have a heated, finely porous plug of a suitable high work function material such as tungsten through which a fuel such as cesium vapor may diffuse and evaporate from the frontal surface as ions. After considerable experience, it has been found that a very small average pore size and a very high average pore concentration were necessary to obtain the desired degree of ionization when the propellant gas is passed through the ionizer porous plug. Thus, for example, it has been found that for ionizing cesium vapor by passing it through a tungsten porous plug, an average pore size of about 1 micron at an average center to center pore spacing of about 2 microns is the best pore size and concentration for high ionizer efficiency. Initially, the desired porous structure was formed by a process wherein spherical tungsten powder in the size range of 2–5 microns was pressed and sintered together to give a porous structure which produced the desired pore size and concentration. Such ionizers gave exceptional performance for short periods of time. However, they were found to have a high temperature instability resulting from the high free surface energy present in a compact produced by powders of small diameters. Thus, under the conditions of high temperature operation, the process of sintering continued so that the permeability and pore size of the porous plug decreased until it was useless. Another disadvantage of such prior process was that it required use of large amounts of expensive spherical powder having an extremely small diameter within a specific size range. At present, efforts are being made to develop grain growth inhibitors which effectively stabilize ionizer structures made from such small powders against further densification at high temperatures, but to date such efforts have been only partially successful.

Consequently, an object of the present invention is an inexpensive method of producing a stable porous structure.

Another object of the present invention is a method of producing a porous structure having a selected pore size and concentration and which is resistant to cracking and decreasing permeability when operated for long periods at high temperatures.

Still another object of the present invention is an ionizer structure which has a high surface portion area.

Other objects and advantages of the present invention will be readily apparent from the following description and drawings which illustrate a preferred exemplary embodiment of the present invention.

In general, the method of the present invention involves forming a porous structure of desired configuration from a coarse powder with such porous structure having a larger pore size and lower pore concentration than the selected pore size and concentration. Such porous structure is then etched to increase the pore concentration. Finally, the etched pore structure is then impregnated by a fine powder which is then joined to the pore structure to reduce the pore size. The porous structure of the present invention involves a matrix of pressed and sintered together coarse powder having a surface portion with enlarged pore entrances. In the surface portion is a filler of fine powder which is sintered together and to the matrix and which is substantially confined to the pore entrances in the form of a plurality of discrete islands.

In order to facilitate understanding of the present invention, reference will now be made to the appended drawings of a preferred specific embodiment of the present invention. Such drawings should not be construed as limiting the invention which is properly set forth in the appended claims.

In the drawings:

FIG. 1 is a block flow diagram of the method of the present invention.

FIG. 2 is an enlarged cross section of a pressed, sintered, and machine pore structure formed out of coarse, spherical powder.

FIG. 3 is an enlarged schematic cross section of a pore structure of FIG. 2 after it has been etched.

FIG. 4 is an enlarged schematic cross section of the pore structure of FIG. 3 with fine powder filling and sintered to its surface portion.

As illustrated in FIGS. 1–4, the process of the present invention involves first forming a porous structure of desired configuration from a coarse powder with such structure having a larger pore size and lower pore concentration than the selected pore size and concentration. For example, as set forth above, it is known that the optimum pore size for tungsten ionizers is an average diameter of about 1 micron with a spacing between pores of an average of about 2 microns. For such selected pore size and concentration for a tungsten ionizer, the starting material of the process of the present invention is spherical tungsten powder having a size range of −200 mesh to +325 mesh. The forming of the porous structure of desired configuration involves pressing and sintering the coarse power by conventional powder metallurgy methods to form a rough, porous structure. Thus, for example, the above specified coarse tungsten powder is sintered at about 2,000° C. for about one hour. The rough porous structure is then infiltrated with a supporting agent such as copper or silver and then machined to the desired configuration. The use of a supporting agent provides the mechanical strength for the porous structure during the machining operation so that a smooth cut may be obtained and, also, it provides a lubricating means to aid in the machining operation. After the porous structure has been machined to the desired configuration, the supporting agent is removed from the porous structure by vacuum evaporation.

The porous structure of the desired configuration is then etched to increased the pore concentration as illustrated in FIG. 3. Thus, the etching process not only opens up the pores but reduces the spacing between the pores to the selected figure. The etching of the porous structure is done by conventional powder metallurgy methods. Thus, for example, in the case of the tungsten ionizer, the etched solution is made up of equal parts by volume of hydrogen peroxide and ammonium hydroxide in standard concentrations and the etching is done by immersion at room temperature for a period of about 20 minutes. Such etching, as illustrated in FIG. 3, enlarges the pore entrances so that they taper inwardly and the distances between adjacent pores at the surface of the pore structure is substantially reduced.

After etching, the surface portion of the porous structure is impregnated with a fine powder which is joined to the porous structure to reduce the pore size. For example, when making the tungsten ionizer described above, the fine powder is spherical tungsten powder having a size range of 1–4 microns. Such fine tungsten powder is positioned in the surface portion of the porous structure and then sintered together and to the pore structure by sintering at about 1,500° C. for about one hour in a vacuum.

The porous structure resulting from the process of the present invention has high temperature stability and high surface portion area as illustrated in FIG. 4. As shown, the product of the present invention comprises a matrix pressed and sintered together of coarse powder having a surface portion with enlarged pore entrances. Such pore entrances taper inwardly and are filled with a fine powder which is sintered together and sintered to the matrix. Thus, the fine powder is substantially confined to the pore entrances in the form of a plurality of discrete islands.

Many other specific embodiments of the present invention will be obvious to one skilled in the art in view of this disclosure. Thus, although the present invention has been described particularly with regard to ionizer structures, it is applicable to any porous structure having a high surface area and thus having stability problems at high temperatures. Similarly, although the present invention has been exemplified by use of tungsten powder, the ionizer structure may be constructed of any material having a high work function such as rhenium or tantalum.

There are many features in the present invention which clearly show the significant advance the present invention represents over the prior art. Consequently, only a few of the more outstanding features will be pointed out to illustrate the unexpected and unusual results obtained by the present invention. One feature of the present invention is that the major portion of the porous structure is constructed of relatively inexpensive powder of large particle diameter and thus has high temperature stability. Another feature of the present invention is a porous structure having a plurality of discrete islands of fine powder in the enlarged pore entrances of the matrix of coarse powder. Thus, when such powder is subject to the usual shrinkage and densification of high temperatures, the porous structure as a whole does not crack and the overall permeability of the pore structure is not substantially reduced. Thus, the average pore size is not substantially affected by the changes in the islands of fine powder. Still another feature of the present invention is that the surface portion of the ionizer is made up of substantially individual spheres of fine powder so that a high surface area is achieved. Present ionizer surfaces usually involve chords of such spheres as a result of the machining operation so that the resulting surface area is substantially reduced. Still another feature of the present invention is that the use of a fine filler powder in the surface portion of the ionizer permits the use of different materials on the front surface of the ionizer. For example, the enlarged pore entrances may be filled with metals such as osmium, rhenium, or ceramic such as, for example, aluminum oxide powder, when the matrix is formed out of tungsten.

It will be understood that the foregoing description and examples are only illustrative of the present invention and it is not intended that the invention be limited thereto. All substitutions, alterations, and modifications of the present invention which come within the scope of the following claims to which the present invention is readily susceptible without departing from the spirit and scope of this disclosure are considered part of the present invention.

I claim:

1. A method for producing a stable porous structure having a selected pore size and concentration and large surface portion area comprising:
   (a) forming a porous structure of desired configuration from a coarse powder, said structure having a larger pore size and lower pore concentration than a selected pore size and concentration;
   (b) etching said porous structure to increase the pore concentration; and,
   (c) impregnating and joining a fine powder to said porous structure to reduce the pore size.

2. A method as stated in claim 1 wherein the forming of said porous structure of desired configuration comprises:
   (a) pressing and sintering said coarse powder to form a porous structure;
   (b) infiltrating said porous structure with a supporting agent;
   (c) machining the infiltrated porous structure to the desired configuration; and
   (d) removing the supporting agent from the porous structure of desired configuration.

3. A method as stated in claim 1 wherein said porous structure is etched on one surface to enlarge the pore entrances.

4. A method as stated in claim 1 wherein the impregnating and joining of a fine powder to the porous structure comprises:
   (a) filling the surface portion of the porous structure with a fine powder; and
   (b) sintering said fine powder together and to said porous structure.

5. A method as stated in claim 1 wherein said coarse powder is spherical and has a size range of −200 to +325 mesh and said fine powder is spherical and has a size range of about 1–4 microns.

6. A method as stated in claim 1 wherein said powder is tungsten.

7. A method as stated in claim 6 wherein said etching is done by a solution consisting essentially of ammonium hydroxide and hydrogen peroxide.

8. A pore structure having high temperature stability and high surface portion area comprising:
   (a) a matrix of pressed and sintered together coarse powder having a surface portion with enlarged pore entrances and a filler in said surface portion of fine powder sintered together and to said matrix, said fine powder being substantially confined to said pore entrances in the form of plurality of discrete islands.

9. A pore structure as stated in claim 8 wherein said enlarged pore entrances taper inwardly.

10. A method for producing a stable porous structure having a selected pore size and large surface portion area comprising:
- (a) forming a porous structure of desired configuration from a coarse powder, said structure having a larger pore size than a selected pore size; and
- (b) impregnating and joining a fine powder to said porous structure to reduce the pore size to said selected pore size.

References Cited

UNITED STATES PATENTS

| | | | |
|---|---|---|---|
| 1,552,184 | 9/1925 | Adams | 29—182.1 |
| 1,988,861 | 1/1935 | Thorausch | 75—222 |
| 2,401,221 | 5/1946 | Bourne | 75—208 |

FOREIGN PATENTS

| | | |
|---|---|---|
| 494,956 | 11/1938 | Great Britain. |
| 544,903 | 5/1942 | Great Britain. |
| 646,001 | 11/1950 | Great Britain. |

CARL D. QUARFORTH, *Primary Examiner.*

BENJAMIN R. PADGETT, *Examiner.*

A. J. STEINER, *Assistant Examiner.*